United States Patent [19]
Masaki et al.

[11] Patent Number: 4,750,065
[45] Date of Patent: Jun. 7, 1988

[54] CARTRIDGE LOADING MECHANISM FOR MAGNETIC DISK DRIVE

[75] Inventors: Hiroshi Masaki; Akira Kadonaga, both of Kanagawa, Japan

[73] Assignee: Sony Corporation, Tokyo, Japan

[21] Appl. No.: 912,989

[22] Filed: Sep. 29, 1986

[30] Foreign Application Priority Data

Oct. 5, 1985 [JP] Japan .................. 60-222286

[51] Int. Cl.⁴ .................. G11B 5/016; G11B 5/54
[52] U.S. Cl. .................. 360/99; 360/105
[58] Field of Search .................. 360/97, 99, 105, 109, 360/135, 86; 369/77.1, 77.2, 261, 270, 271

[56] References Cited

U.S. PATENT DOCUMENTS

| 4,368,495 | 1/1983 | Hamanaka et al. | 360/97 |
| 4,669,009 | 5/1987 | Naoi et al. | 360/99 |

FOREIGN PATENT DOCUMENTS 0080162  5/1985  Japan .................. 369/77.2

Primary Examiner—Robert S. Tupper
Assistant Examiner—Andrew S. Snigeh
Attorney, Agent, or Firm—Philip M. Shaw, Jr.

[57] ABSTRACT

A recording and/or reproducing apparatus for a cassette mounted, flexible magnetic disk, wherein the apparatus includes a cassette holder which rides upon camming surfaces carried by a slide plate which, when moved relative to the cassette holder, lowers the cassette holder onto a disk drive turntable in a manner such that the end of the holder closest to the magnetic recording/reproducing heads is lowered last whereby the disk is fully chucked by the turntable before being engaged by upper and lower magnetic recording/reproducing heads.

6 Claims, 6 Drawing Sheets

CARTRIDGE LOADING MECHANISM FOR MAGNETIC DISK DRIVE

BACKGROUND OF THE INVENTION

1. Field of the Invention

This invention relates to a recording and/or reproducing apparatus for flexible magnetic disks, wherein a disk cassette consisting of a cassette and a flexible sheet-like magnetic disk, such as microfloppy disk, accommodated in the cassette, is chucked and the magnetic disk in the disk cassette is rotationally driven for writing or reading information signals to or from the magnetic disk.

2. Related Art Statement

Heretofore, in a recording and/or reproducing apparatus for flexible magnetic disks, in which a disk cassette such as micro-floppy disk, is attached or mounted and the information signals are written to or read from the magnetic disk contained in the cassette, there is provided an enclosed a built-in disk attachment unit whereby the magnetic disk is chucked and secured to the disk table of the rotational driving device for the magnetic disk. The disk attachment unit is so designed that, as the disk cassette is introduced by way of the disk insertion and removable opening or aperture, the cassette holder is lowered for pressure holding of the disk cassette on the positioning pins while the magnetic disk is chucked on the disk table. The casette holder of the disk attachment unit operating in the above described manner is mounted with top of a loading plate slidably disposed on top of the chassis and, as the loading plate is slid on the chassis, the cassette holder is moved vertically up and down with respect to the chassis. The magnetic disk is chucked and attached onto the disk table as described above when the cassette holder is lowered with respect to the chassis.

In operative association with the lowering of the cassette holder, a supporting arm of the head unit carrying a magnetic head or a disk supporting pad at the distal end thereof is rotated into abutment on the magnetic disk. The magnetic head or the disk supporting pad at the distal end of the thus rotated supporting arm and another magnetic head at the distal end of the other supporting arm facing the aforementioned supporting arm are brought into sliding contact with the magnetic disk while clamping the disk therebetween so as to enable information signals to be written to or read from the disk.

When the loading plate is slid for floating the cassette holder, the disk is unchucked from the disk table while the disk cassette is ejected towards the disk insertion or removal opening.

In the above described conventional disk attachment unit, when the loading plate is slid to lower the cassette holder onto the disk table for chucking the magnetic disk in the cassette onto the disk table of the rotational driving device for the magnetic disk, the cassette holder is caused to descend horizontally onto the disk table. The supporting arm of the head device is also turned towards the magnetic disk in operative association with and nearly at the same time as the lowering of the cassette holder. The magnetic disk is clamped between the magnetic head or the disk supporting pad at the distal end of the supporting arm and the magnetic head at the distal end of the other supporting arms.

In the above described conventional disk attachment unit wherein the clamping of the magnetic disk by the head unit takes place almost concurrently with the lowering of the cassette holder holding the disk cassette, there is the risk that the magnetic disk may be clamped by the head unit prior to complete engagement of the center opening in the metallic center core secured to the magnetic disk by the spindle of the rotational driving unit of the magnetic disk. As a result, chucking of the magnetic disk onto the disk table is occasionally insufficient so that it may be impossible to drive the magnetic disk into rotation.

In order to prevent the occurrence of insufficient chucking as described above, it may be contemplated to chuck the magnetic disk by the head unit after the cassette holder is lowered onto the disk table. Thus it has been contemplated to provide rotation delay means whereby the supporting arm of the head unit is turned with a delay relative to the descent of the cassette holder. When the rotation delay device for the supporting arm is provided in this manner, the overall system is necessarily complicated, while the production costs are not lowered.

SUMMARY OF THE INVENTION

It is therefore an object of the present invention to provide a recording and/or reproducing apparatus for flexible magnetic disks wherein the magnetic disk is clamped by the head unit after the disk within the cassette is chucked to the disk table of the rotational driving device for the magnetic disk, so as to enable positive chucking of the magnetic disk without complicating the overall system.

It is a further object of the present invention to provide a recording and/or reproducing apparatus wherein the magnetic head abuts on the magnetic disk at the time of attachment of the disk cassette only after the disk is chucked and wherein the magnetic heads are moved away from each other at the time of ejection of the disk cassette before the magnetic disk is unchucked so as to prevent injury to and provide a sufficient protection of the magnetic head.

For achieving these objects, the present invention provides an arrangement comprising a cassette holder in which there is inserted and held a disk cassette rotatably accommodating a magnetic disk in a cassette, a driving device for rotationally driving the magnetic disk in the cassette, means for raising and lowering the cassette holder relative to the driving device, and a head unit including a pair of supporting arms movable between the inner and outer peripheries of the magnetic disk chucked in the rotational driving device and provided at their distal ends with magnetic heads and/or disk supporting pads slidably contacting the upper and lower sides of the magnetic disk, these supporting arms being arranged in opposition to the inserting direction of the disk cassette, with one of the supporting arms being turned in operative association with the up or down movement of the cassette holder so that the magnetic head or disk supporting pad at the distal end is brought into or out of contact with the magnetic disk, wherein means are provided to said holder raising and lowering means for lowering the cassette holder with a delay at the head unit side thereof relative to the inserting side of the disk cassette.

The foregoing and other objectives, features and advantages of the invention will be more readily understood upon consideration of the following detailed description of certain preferred embodiments of the invention, taken in conjunction with the accompanying drawings.

DETAILED DESCRIPTION OF THE INVENTION

Reference is now had to the accompanying drawings showing certain preferred embodiments of the present inventions.

Figure 9:
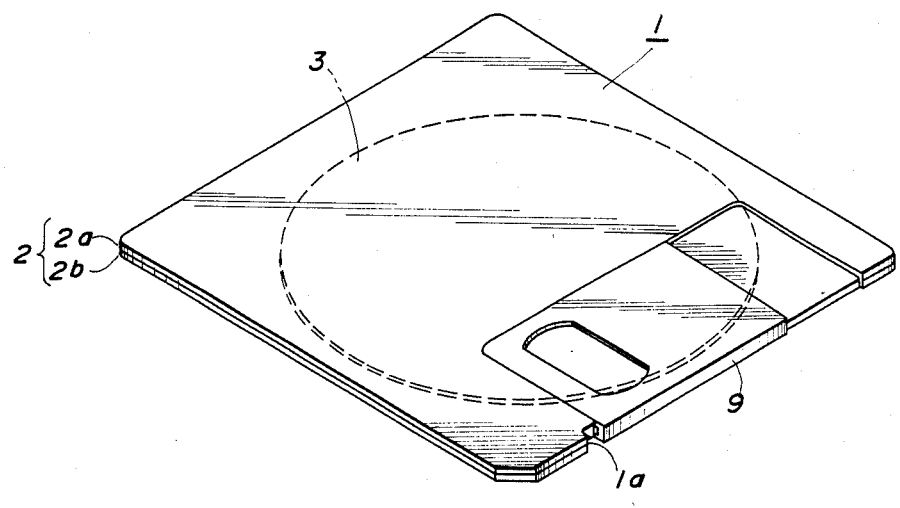
FIG. 9 is a perspective view of the disk cassette to be attached to the recording and/or reproducing apparatus.
Figure 10:
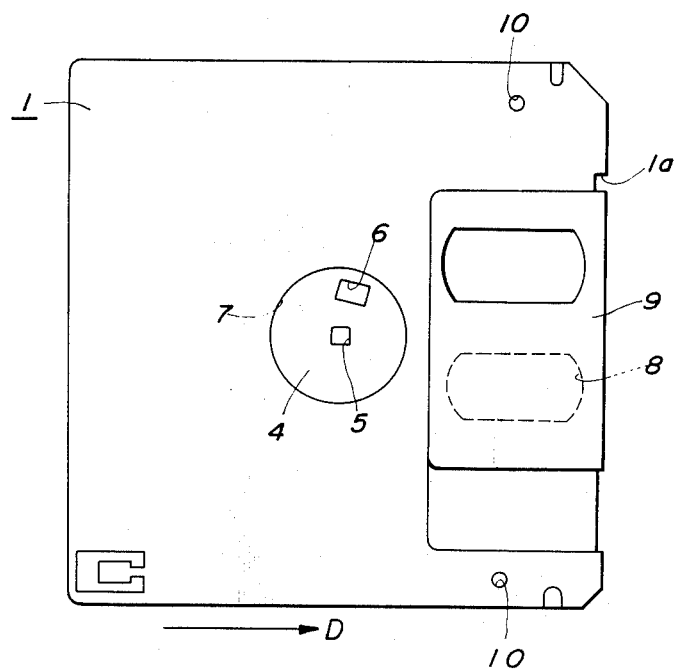
FIG. 10 is a bottom view of the disk cassette.

A disk cassette to be attached to a recording and/or reproducing apparatus of the present invention will first be explained. Referring to FIGS. 9 and 10, a sheet-like magnetic disk 3 is rotatably accommodated in a disk cassette 1 consisting of a casette half 2 comprised of an upper half 2a and a lower half 2b. A center core 4 formed by a metallic disk is securely attached to the center of the magnetic disk 3. A center opening 5 and a driving pin insertion opening 6 are provided at the center and at a position offset from the center of the center core 4, respectively. The center opening 5 is square while the driving pin insertion opening 6 is rectangular in configuration. The center core 4 is loosely fitted in a disk table insertion opening 7 provided at the center of the lower half 2b. A magnetic head insertion opening 8 provided in the upper and lower halves 2a, 2b along the radial direction of the magnetic disk 3 is adapted to be opened and closed by a shutter 9. In the flat surface of the lower half 2b of the cassette half 2, positioning pin engaging apertures 10, 10 are formed on both sides of the shutter 9.

The recording and/or reproducing apparatus of the present invention is now explained, in which the disk cassette 1 constructed as described above is attached and which operates to rotationally drive the magnetic disk 3 accomodated in the disk cassette 1 while operating to write or read information signals to or from the magnetic disk 3.

Figure 2:
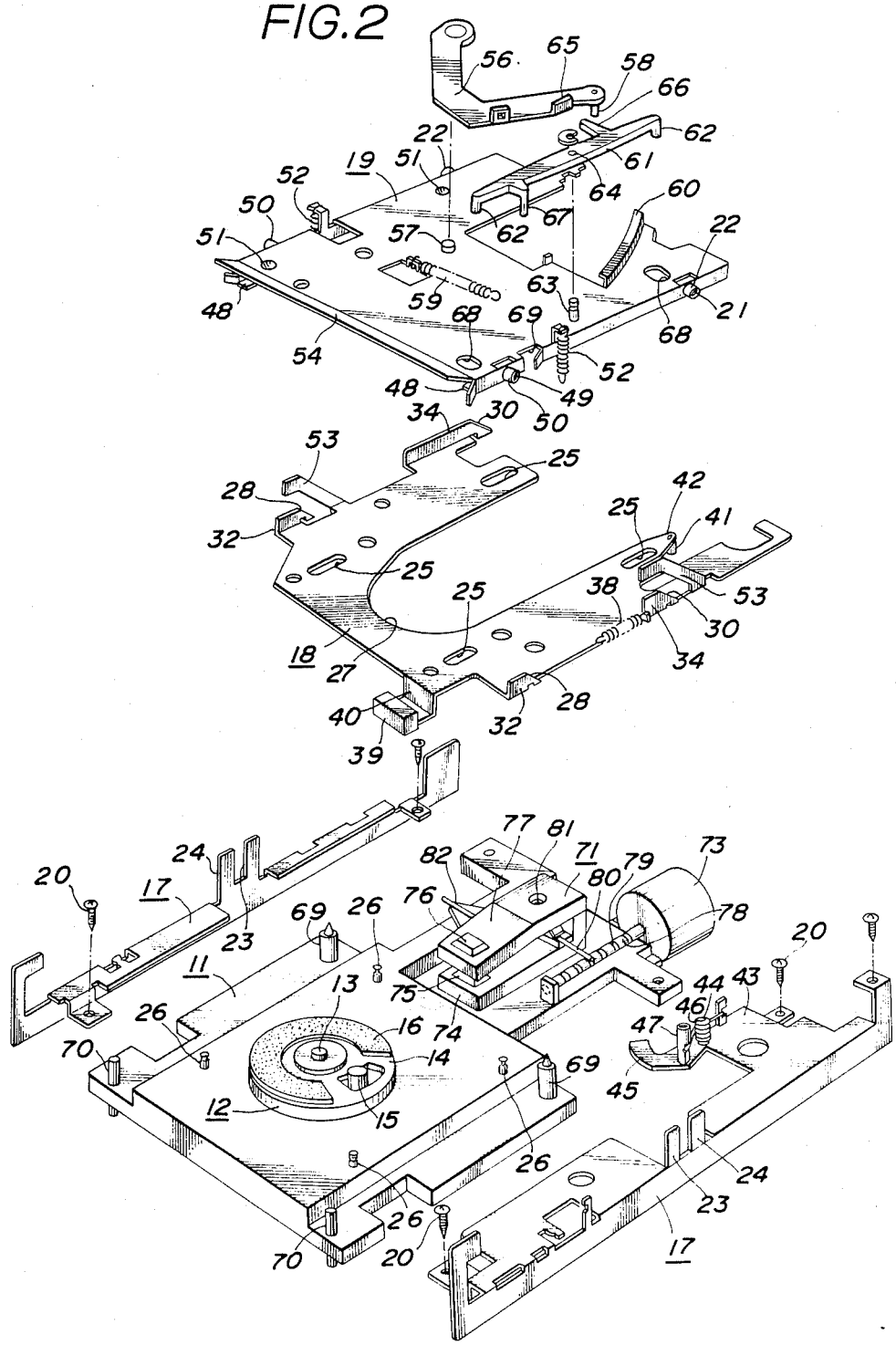
FIG. 2 is an exploded perspective view thereof.

As shown in FIG. 2, the apparatus has a rotational driving device 12 built into a chassis 11 and adapted for rotationally driving the magnetic disk 3 accommodated in the disk cassette 1. The rotational driving device 12 has a disk table 14 fitted to, and engaged by a spindle shaft 13 connected to an output shaft of a driving electric motor (not shown). On the disk table 14, a driving pin 15, biased to rotate in a circumferential direction relative to the disk table 14, is attached at a position offset from the spindle shaft 13, while a permanent magnet 16 is also attached for magnetically attracting and chucking the center core 4 of the magnetic disk 3. When the disk cassette 1 is attached to the disk table 14, the magnetic disk 3 is chucked, with the spindle shaft 13 engaging in the center opening 5 of the center core 4, the driving pin 15 engaging in the driving pin insertion opening 6 and with the center core 4 attracted by the permanent magnet 16. When the rotational driving device 12 is driven in this manner, the magnetic disk 3 is positioned on the disk table 14 and rotationally driven as one with the disk table 14.

On both sides of the chassis 11 to which there is attached the rotational driving device 12 constructed as described above, a pair of opposing side plates 17, 17 are attached, as shown in FIG. 2. Between these side plates 17, 17, a loading plate 18 is disposed so as to slide on the chassis 11. On top of the loading plate 18, a cassette holder 19 is disposed so as to provide a gap for insertion of the disk cassette 1.

Figure 4:
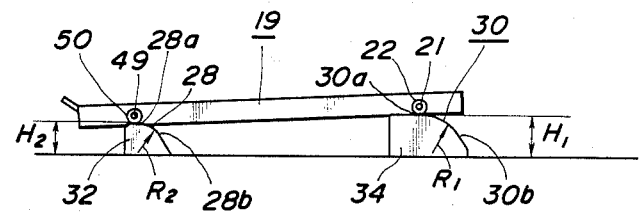
FIG. 4 is a diagrammatic side view showing the relation between the cam plates and the guide rolls.

These side plates 17, 17 are securely mounted to the chassis 11 by associated screws 20. To the inner sides of these side plates 17, 17, there are implanted slide guide pieces 24, 24 defining slide guide grooves 23, 23 in which are engaged guide rolls 22, 22 provided on projecting supporting shafts 21 (FIG. 4), 21 at rearward parts on both lateral sides of the cassette holder 19. These slide guide grooves 23, 23 are provided vertically with respect to the plane of the chassis 11. The leading plate 18 has four elongate apertures 25, one pair on each lateral side, in which are introduced four slide guide pins 26 implanted on the chassis 11, such that the loading plate 18 is mounted on the chassis 11 for sliding within the extent of these elongate apertures 25. At the center of the loading plate 18 is formed a cut-out or recess 27 opened towards the rear side so as to be confronted by the disk table 14. On both lateral sides of the loading plate 18, there are formed a forward pair of cam plates 32, 32 having curvilinear inclined cam surface 28, 28 and a rearward pair of cam plates 34, 34 having curvilinear inclined surfaces 30, 30. By virtue of these cam surfaces, the cassette holder 19 is supported in the floated position during the time the disk cassette 1 is ejected and during the time the cassette holder 19 is readied for receiving the disk cassette. The cassette holder 19 is also floated during the time the disk cassette 1 is held in the cassette holder under pressure as described hereafter in detail. The rearward pair of the cam plates 34, 34 are so designed that, as shown in the schematic views of FIGS. 1 and 4, the height $H_1$ from the plane of the loading plate 18 to the horizontal portions 30a, 30a of the inclined cam surfaces 30, 30 thereof is higher than the height $H_2$ from the plane of the loading plate to the horizontal portions 28a, 28a of the inclined cam surfaces 28, 28 of the forward pair of the cam plates 32, 32. In addition, the radius of curvature $R_1$ of each of the inclined portions 30b, 30b of the inclined cam surfaces 30, 30 of the rearwardly positioned pair of the cam plates 34, 34 is selected to be larger than the radius of curvature $R_2$ of each of the inclined portions 28b, 28b of the inclined cam surfaces 28, 28 formed on the forward cam plates 32, 32.

Figure 3:
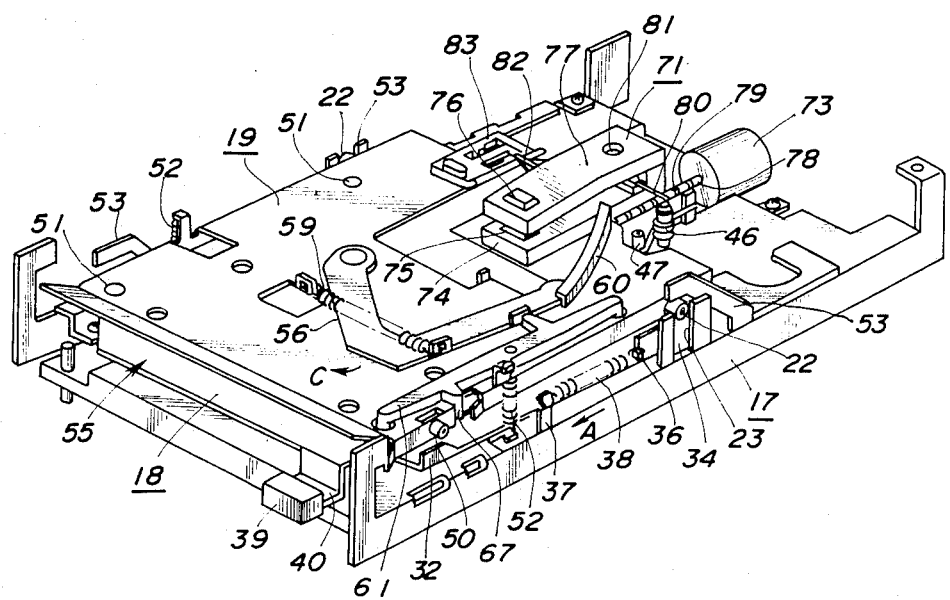
FIG. 3 is an overall persepctive view thereof.

Also the loading plate 18 is biased towards the forward side or along the arrow mark A in FIG. 3 by a tension spring 38 installed between an engaging portion 36 integral with the leading plate 18 and an engaging portion 37 integral with one of the side plates 17. To the forward side of the loading plate 18, there is integrally formed a button attachment portion 40 having an ejection button 39. To the lower rear surface of the loading plate 18 thus slidably mounted on the chassis 11 under the spring bias of the tension spring 38, there is mounted a depending locking pin 42 fitted with roller 41. When the loading plate 18 is in the eject position, the locking pin 42 is engaged with a locking lever 45 turnably supported on a supporting shaft 44 implanted on an attachment portion 43 integral with one of the side plates 17, for locking the loading plate 18 at the eject position against the action of the tension spring 38.

It is noted that the locking lever 45 is biased to rotate clockwise as viewed in FIG. 2 by a torsion coil spring 46. A projection 47 is implanted on the mid portion of the locking lever 45 so as to be pushed against by one end of the disk cassette 1 during the process of the insertion thereof.

The cassette holder 19 is formed as a square flat plate of approximately the same size as the disk cassette 1. On both lateral sides of the cassette holder 19 are integrally formed slide guides 48, 48 having a U-shaped cross-section and adapted for supporting and guiding both lateral sides of the disk cassette 1 during the process of the insertion thereof. On both outer lateral sides of the cassette holder 19, in addition to the rearward pair of the guide rolls 22, 22, there are provided a forward pair of guide rolls 50, 50 rotatably mounted on supporting shafts 49, 49. These guide rolls 50, 50 are of the same diameter and provided at the same height in the direction of thickness of the cassette holder 19 as the rearward guide rolls 22, 22.

These rearward and forward guide rolls 22, 22; 50, 50 are so positioned that, when the cassette holder 19 is mounted on the loading plate 18, the guide rolls are in register with the cam plates 34, 34; 32, 32, respectively. On one lateral side of the cassette holder 19, a pair of small projections 51, 51 contacting the disk cassette 1 are formed and extend towards the lower side of the cassette holder. On the front side of the cassette holder 19 is formed an inclined guide 54 adapted for guiding the disk cassette 1 during the process of insertion thereof. The cassette holder 19 is so mounted that the rear guide rolls 22, 22 are engaged in the slide guide slots 23, 23 of the slide pieces 24, 24 while the rear and forward guide rolls 22, 22; 50, 50 are caused to rest on the rear and forward cam plates 34, 34; 32, 32 of the loading plate 18, respectively. Since the rear cam plates 32, 32 on which rest the rear guide rolls 50, 50 are at a higher level than the forward cam plates 32, 32 on which rest the forward guide rolls 50, 50, the cassette holder 19 in the attachment position is titled such that the rear or inner side thereof is at a higher level than the forward or inserting side of the disk cassette 1.

Between the cassette holder 19 thus placed on the loading plate 18 and the side plates 17, 17, there are provided a pair of compression springs 52, 52 for normally biasing the cassette holder 19 in the direction of the chassis 11. In opposition to one of the rear cam plates 34 and to one of the forward cam plates 32 of the loading plate 18, guide pin extraction inhibit projections 53, 53 each being in the shape of the letter U are formed on the loading plate 18 to inhibit extraction of the guide rolls 50, 22 of the cassette holder 19 placed on these cam plates 34, 32.

The space defined between the cassette holder 19 and the loading plate 18 is used for accommodating the disk cassette 1, while the forward side is formed as an insertion or removal opening 55 for the disk cassette 1.

On the cassette holder 19 attached to the loading plate 18 as described above, there is pivotally mounted an L-shaped shutter opening and closing lever 56 which is turned in a direction parallel to the plane of the disk cassette 1 attached thereto, that is, on the surface of the cassette holder 19, and which is adapted for opening and closing the shutter 9 of the disk cassette 1. The shutter opening and closing lever 56 has its proximate end pivotally mounted on a journal projection 57 implanted on the cassette holder 19. The lower surface of the distal end of the lever 56 is formed with a thrust pin 58 projecting beyond the lower surface of the cassette holder 19 so as to be engaged with a step 1a formed on the front side of the disk cassette 1 so as to abut on one side of the shutter 9. The lever 56 is biased to rotate clockwise, as indicated by an arrow mark C in FIG. 3, by a spring 59 installed between the cassette holder 19 and the shutter opening and closing lever 56. It will be noted that an arcuate guide wall 60 is formed on the cassette holder 19 along the trajectory along which the distal end of the shutter opening and closing lever 56 is turned.

On one lateral side of the cassette holder 19, facing the distal end of the shutter opening and closing lever 56, there is rotatably mounted a cassette thrust arm 61 formed of, for example, resilient synthetic resin. As shown in FIG. 2, the cassette thrust arm 61 has depending cassette thrust end pins 62, 62, a center journal 64 for receiving a supporting projection 63 implanted on the cassette holder 19, a lug 66 on one side of the arm 61 which is engaged by a thrust portion 65 formed on one side of the shutter opening and closing lever 56, and a depending thrust portion 67 on the other side thereof adapted for contacting and supporting one side of the disk cassette 1.

The center journal 64 is located along the length of the arm 61 so that the thrust end pins 62, 62 will face toward oblong through-holes 68, 68 formed in the cassette holder 19, the thrust portion 67 will face toward a cut-out or window 69 on one lateral side of the cassette holder 19 and so that the supporting projection 63 will have a small clearance. When the cassette holder 19 is in the floated eject state, the cassette thrust arm 61 thus mounted has its lug 66 pushed by the thrust portion 65 of the shutter opening and closing lever 56 as shown in FIG. 3 so that the thrust portion 67 intrudes into the inner portion of the cassette holder 19. Also, the cassette thrust arm 61 regulates the rotational position of the shutter opening and closing lever 56 since the arm 61 may be turned only within the extent of the through-holes 68, 68 confronted by the cassette thrust end pins 62, 62. When the shutter opening and closing lever 56 is in the state in which its rotation is regulated by the cassette thrust arm 61, the lever 56 is so positioned that the thrust pin 58 abuts on one side of the shutter 9 which is in the position of closing the disk cassette 1.

On the chassis 11, there are implanted positioning pins 69, 69 engaged in positioning pin engaging apertures 10, 10 in the disk cassette 1 chucked to the turntable 12 and positioning pins 70, 70 abutting on the surface of the disk cassette 1.

On the chassis 11, there is further provided a head unit 71, towards the rear side and opposite to the side for inserting the disk cassette 1. The head unit 71 is provided with an insertion and removal opening 75 for the disk casette 1. The head unit 71 is formed by a first supporting arm or a lower head arm 74 and a second supporting arm or an upper head arm 77. The first supporting arm 74 is supported by having a through-hole therein passed through by a slide guide shaft 72 (FIGS. 5 and 6) provided on the underside and extending in the direction of the radius of the magnetic disk 3 chucked on the disk table 14. As will be explained, the head unit 71 is moved radially along the shaft 72 with respect to magnetic disk 3 by means of a stepping motor 73. The upper supporting arm 77 of the head unit 71 is mounted facing towards and for rotation relative to the lower supporting arm 74 and is provided at its distal end with a second magnetic head 76 facing toward a first magnetic head 75 mounted in the foremost part of the supporting arm 74. The lower supporting arm 74 has a feed pin 80 engaging in a spiral feed groove 79 formed on a feed shaft 78 which is mounted parallel to the slide guide shaft 72 and which is coupled to the output shaft of the stepping motor 73. Upon rotation of the feed shaft 78, the first supporting arm 74 is guided along the slide guide shaft 72 along with the second supporting arm 77 so as to be transported between the inner and outer peripheries of the magnetic disk 3 chucked onto the disk table 14.

The second supporting arm 77 is mounted with a rotational bias towards the first supporting arm 74 by a spring 81 and with a rotational operating member 82 projecting on one side thereof and engaging with a cooperating rotational operating member 83 (FIG. 5) provided on the cassette holder 19. Thus the second supporting arm 77 is turned away from the first supporting arm 74 by the upward movement of the cassette holder 19 and turned towards the first supporting arm 74 under the force of the spring 81 by the downward movement of the cassette holder 19. The second magnetic head 76 at the distal end of the second supporting arm 77 is brought into contact with the first magnetic head 75 with a predetermined pressure. When the magnetic disk 3 is mounted between these first and second magnetic heads, the second supporting arm 77 is biased by the spring 81 so that the second magnetic head 76 abuts against the upper surface of the disk 3 with a predetermined pressure. Thus the first and second magnetic heads 75, 76 are kept in sliding contact with each other while holding the magnetic disk 3 therebetween.

In the case where the disk cassette has a recording surface on only one surface thereof, a disk supporting pad formed for example of felt is provided on the second supporting arm 77 in place of the second supporting arm 77.

The operation of mounting or attaching the disk cassette 1 in the apparatus of the present invention will now be explained.

Figure 1:
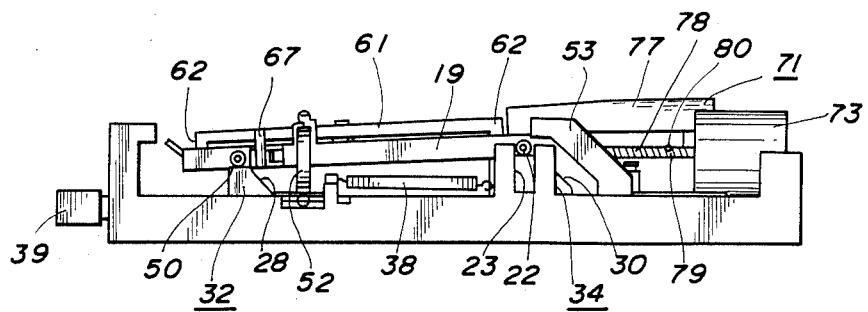
FIG. 1 is a side view showing the recording and/or reproducing apparatus according to the present invention.
Figure 5:
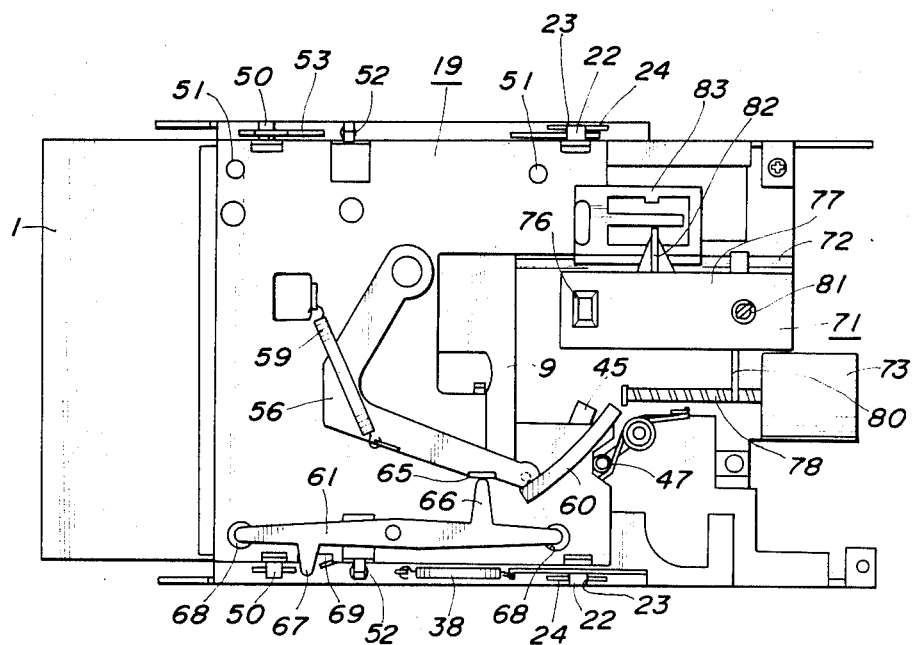
FIG. 5 is a plan view showing the disk cassette being inserted into the recording and/or reproducing apparatus.
Figure 6:
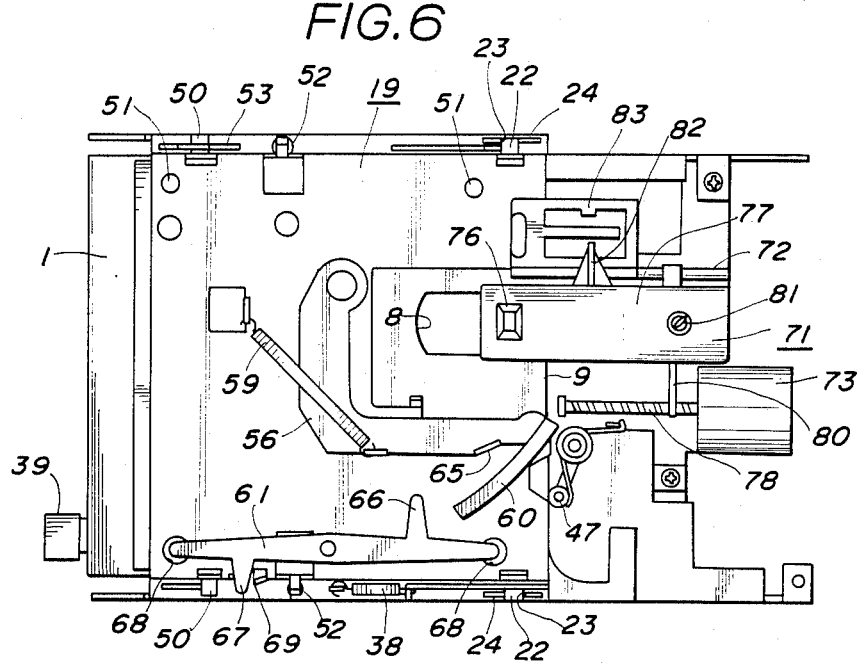
FIG. 6 is a plan view showing the disk cassette when attached or mounted in the recording and/or reproducing apparatus.
Figure 7:
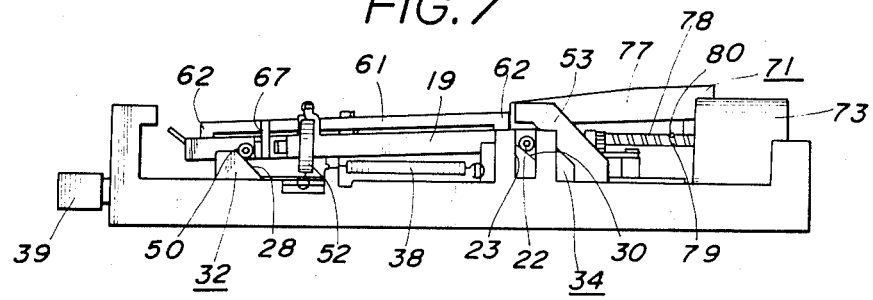
FIG. 7 is a side view of FIG. 5.
Figure 8:
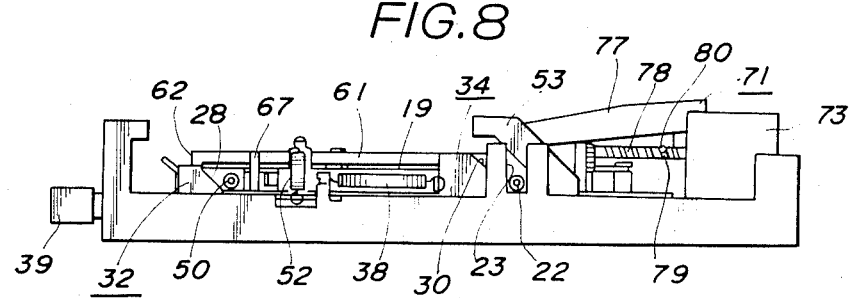
FIG. 8 is a side view of FIG. 6.

When mounting the disk cassette 1, the loading plate 18 is positioned so that the respective guide rolls 22, 22; 50, 50 are positioned on the horizontal portions 28a, 28a; 30a, 30a of the inclined cams 28, 28; 30, 30 of the cam plates 32, 32; 34, 34, the cassette holder 19 being thereby floated as shown in FIGS. 1 and 3. The disk cassette 1 is introduced in the direction labeled D in FIG. 10 into the opening 55, with the shutter being on the side. As the disk cassette 1 is inserted as shown in FIG. 5, the thrust end pin 58 is engaged with the step 1a on one side of the shutter 9 to abut on the side of the shutter 9. As the disk cassette 1 is inserted further, the shutter opening and closing lever 56 is turned counter-clockwise against the force of the spring 59 while its thrust pin 58 causes the shutter 9 to be slid to open the head insertion and removal opening 8. Meanwhile, the projection 47 of the locking lever 45 locking the loading plate 18 in the eject position is pushed by one end of the disk cassette 1 so that the lever 45 is turned counter-clockwise in FIG. 5 against the force of the torsion coil spring 46. When the locking lever 45 is turned in this manner, the locking pin 42 becomes unlocked to abut on the foremost edge of the locking lever 45, the loading plate 18 being then slid by spring 38 forwards as shown by the arrow mark A in FIG. 3. When the loading plate 18 is slid forwards, the forward guide rolls 50, 50 and the rearward guide rolls 22, 22 of the cassette holder 19 are shifted to the inclined curvilinear portions 28b, 28b; 30b, 30b from the horizontal portions 28a, 28a; 30a, 30a of the inclined cam surfaces 28, 28; 30, 30 of the forward cam plates 32, 32 and the rearward cam plates 34, 34, as shown in FIG. 7. As the loading plate 18 is slid further forwards, the cassette holder 19 is lowered and pressured onto the loading plate 18 by the compression springs 52, 52, as shown in FIG. 8. When the disk cassette 1 is introduced to a position overlying the disk table 14, the upper surface of the disk cassette 1 is pushed by the small projection 51, 51 and thrust end pins 62, 62 of the cassette thrust arm 61 to force the disk cassette 1 onto the positioning pins 69, 69 and the supporting pins 70, 70. Thus the shutter opening and closing lever 56 is spaced away from the cassette thrust arm 61. Since the thrust arm 61 is supported with a certain clearance by the supporting pin 63, it wobbles in its position as a function of the flexure of the disk cassette 1 to provide for a uniform pressure. At this time, the magnetic disk 3 within the disk casette 1 is chucked with its center opening 5 engaged by the spindle shaft 13 and its center core 4 magnetically attracted by the permanent magnet 16 on the disk table 14 so that it can be rotated with the disk table 14.

Also, in association with the descent of the disk holder 19 as described above, the second supporting arm 77 of the magnetic head unit 71 is turned towards the disk cassette 1 by spring 81 so that the second magnetic head 76 at the distal end thereof intrudes into the magnetic head insertion opening 8 for holding the magnetic disk 3 between the magnetic head 76 and the first magnetic head 75 at the distal end of the first supporting arm 74.

It is noted that, in the apparatus of the present invention, the rear cam plates 34, 34 toward the head unit 71 are at a higher level than the forward cam plates 32, 32 toward the insertion side for the disk cassette 1, while the radius of curvature $R_1$ of the inclined portions 30b, 30b of the inclined cam surfaces 30, 30 of the rear cam plates 34, 34 is selected to be larger than the radius of curvature $R_2$ of the inclined portions 28b, 28b of the inclined cam surfaces 28, 28 of the forward cam plates 32, 32. Therefore, when the cassette holder 19 is lowered, the side of the cassette holder towards the head unit 71 is lowered with a delay relative to that corresponding to the insertion of the disk cassette 1. The disk cassette 1 held by the cassette holder 19 is also lowered with a corresponding delay at the head unit 71. The result is that, after the magnetic disk 3 within the disk cassette 1 is chucked by the disk table 14, the second supporting arm 77 of the head unit 71 is turned towards the magnetic disk 3. In other words, it is after the chucking of the magnetic disk 3 is terminated that the disk is clamped between the first and second magnetic heads 75, 76.

When the magnetic disk 3 is chucked as described above and the magnetic disk 3 is clamped between the first and the second magnetic heads 75, 76, the rotational driving device 12 is driven into operation. This causes the driving pin 15 to be engaged in the driving pin insertion opening 6 while causing the magnetic disk 3 to be positioned ralative to the disk table 14 and turned in unison therewith. The first and the second magnetic heads 75, 76 are then brought into sliding contact with the magnetic disk 3 with a predetermined pressure to enable information signals to be written or read to or from the disk.

After the writing or reading of the information signals to or from the magnetic disk 3 is terminated, the disk cassette in the attached state as shown in FIGS. 5 and 8 can be ejected by actuating the eject button 39 so as to slide the loading plate 18 inwards against the urging of the spring 36. In this case, by the reverse of the operation performed at the time of attachment of the disk cassette 1, the guide rolls 22, 22; 50, 50 of the cassette holder 19 slide on the inclined cam surfaces 28, 28; 30, 30 of the cam plates 32, 32; 34, 34 to be thereby floated, as shown in FIG. 7. The cassette holder 19 is shifted upward away from the loading plate 18 against the urging of the compression spring 52, 52 for pressure holding of the disk cassette 1, while turning the second supporting arm 77 of the head unit 71 upwards and away from the surface of the magnetic disk 3. Meanwhile, when the loading plate 18 is slid inward as described above, the locking pin 42 is engaged with the locking lever 45 for locking the plate 18 at the inner position against the urging force of the spring 38. When the cassette holder 19 is raised to release the pressure holding of the disk cassette 1, the shutter opening and closing lever 56 is turned clockwise by the spring 59 to thrust the disk cassette 1 towards the insertion and removal opening 55. Simultaneously, the thrust portion 65 pushes against the lug 66 of the cassette thrust arm 61 for turning the latter clockwise in FIG. 5. When the cassette thrust arm 61 is turned clockwise in this manner, the depending thrust portion 67 intrudes into the inside of the cassette holder 19 through the cut-out or window 69 thereof to push against the mid portion of the one lateral side of the disk cassette 1 that is being pushed by the lever 56 and that is about to be moved out of the cassette holder. This causes the movement of the disk cassette to be halted. The result is that the disk cassette 1 is supported in the state in which a portion of the disk cassette 1 protrudes out of the insertion and removal opening 55 to permit the disk cassette 1 to be grasped manually for complete extrication thereof.

During the ejection of the disk cassette 1, the cassette holder 19 is floated at the side thereof towards the head unit 71 first by the sequence of operations which is the reverse of that at the time of attachment of the disk cassette 1. Thus it is after the second supporting arm 77 of the head unit 71 is shifted away from the surface of the magnetic disk 3 that the magnetic disk 3 is unchucked from the disk table 14.

Figure 11:
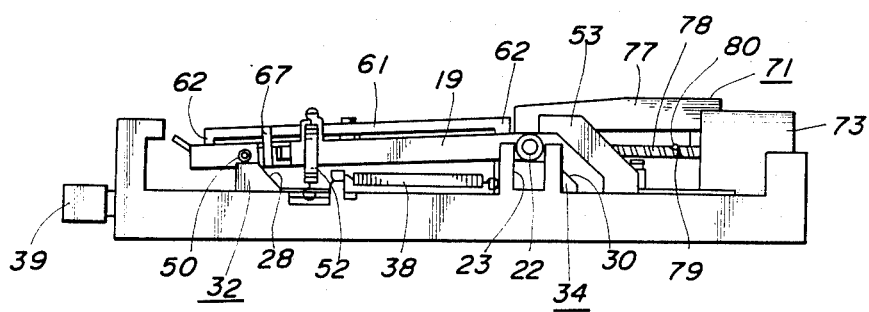
FIG. 11 is a diagrammatic side view showing a modified embodiment of the present invention.

In the above described embodiment, the height of the rear cam plates 34, 34 is set so as to be at a higher level than that of the forward cam plates 32, 32, such that the cassette holder 19 is lowered with a relative delay at the side towards the head unit 71. However, when the cam plates 32, 32; 34, 34 are of the same height but the diameter of the guide rolls 22, 22 resting on the rear cam plates 34, 34 is set so as to be larger than that of the guide rolls 50, 50 resting on the forward cam plates 32, 32, as shown in FIG. 11, it is also possible to cause the cassette holder 19 to be lowered with a relative delay at the side thereof towards the head unit 71.

As still another alternative, when the height of the cam plates 32, 32 is equal to that of the cam plates 34, 34 and the diameter of the guide rolls 22, 22 is also equal to that of the guide rolls 50, 50, but the rear guide rolls 22, 22 are mounted at a lower level than the forward guide rolls 50, 50, it is likewise possible to cause the cassette holder 19 to be lowered with a relative delay at the side thereof towards the head unit 71.

As yet a further alternative, when the length of the inclined cam surfaces 30, 30 of the rear cam plates 34, 34 is set so as to be longer than that of the inclined cam surfaces 28, 28 of the forward cam plates 32, 32, it becomes likewise possible to cause the cassette holder 19 to be lowered with a relative delay at the side thereof towards the head unit 71.

Although the present invention has been shown and described with respect to certain preferred embodiments, various changes and modifications which are obvious to a person skilled in the art to which the invention pertains are deemed to lie within the spirit and scope of the invention.

What is claimed is:

1. A recording and/or producing apparatus for a flexible magnetic disk of the type which has an upper and a lower magnetic recording surface, is contained within a cassette having access openings therein to receive at least one magnetic head and a drive turntable, and is free to rotate within the cassette when it is chucked by the recording and/or reproducing apparatus for recording and/reproducing information signals on or from the disk, said apparatus comprising;

a frame;

a cassette holder into which the disk cassette is inserted from an insertion end thereof;

rotational driving means, including a turntable, mounted on the frame, for chucking and rotationally driving the magnetic disk on the turntable while the disk is contained within the cassette;

raising and lowering means mounted on the frame, for raising and lowering said holder to thereby raise and lower the magnetic disk relative to said turntable and including a slide plate mounted on the frame for sliding movement relative to the cassette holder, the slide plate having a set of camming surfaces for engagement with the cassette holder to cause said holder to be lowered as a result of movement of the slide plate such that the other end of the cassette holder, opposite to the insertion end, is lowered with a delay relative to the insertion end thereof;

magnetic head means including
a lower head arm disposed adjacent the other end of said cassette holder, the lower head arm carrying at the distal end thereof a lower transducer head for sliding contact with the lower surface of the magnetic disk,
an upper head arm arranged in opposition to said lower head arm and carrying at the distal end thereof an upper transducer head,
means for lowering the upper head arm with the lowering of said cassette holder so that the upper transducer head is brought into sliding contact with the upper surface of the magnetic disk after the magnetic disk is chucked on said turntable; and
a carriage for mounting the lower and upper head arms, the carriage being mounted on the frame and adapted to moved radially relative to the magnetic disk chucked on said turntable.

2. A recording and/or reproducing apparatus according to claim 1 wherein said cassette holder has a pair of lateral sides, a first pair of projections, each one of the first pair of projections being located at the other end of a different lateral side, and a second pair of projections, each one of the pair of second projections being located at the insertion end of a different lateral side, the slide plate camming surfaces being in the form of inclined surfaces which engage the projections, whereby the projections slide down along the inclined surfaces to lower said cassette holder when the slide plate is moved relative to the cassette holder.

3. A recording and/or reproducing apparatus according to claim 2 wherein said inclined surfaces include a first set of inclined surfaces and a second set of inclined surfaces said first set of the inclined surfaces are located adjacent the other end of the cassette holder and said second set of the inclined surfaces are adjacent the insertion end of the cassette holder, and wherein the first set of inclined surfaces are at a higher level than the second set of inclined surfaces so that the end of the cassette holder opposite to the insertion end is lowered with a delay relative to the insertion end of the cassette holder.

4. A recording and/or reproducing apparatus according to claim 3 wherein inclined surfaces are arc shaped and the radius of the first set of inclined surfaces is selected to be larger than the radius of the second set of inclined surfaces.

5. A recording and/or reproducing apparatus according to claim 2 wherein said projections are cylindrically shaped and extend out of the lateral sides of said cassette holder, and wherein the diameter of each of the first pair of projections is selected to be larger than that of each of the second pair of projections so that the cassette holder is lowered with a relative delay at the other end as compared to the insertion end.

6. A recording and/or reproducing apparatus according to claim 2 wherein said projections are comprised of rollers which roll on said inclined surfaces.

* * * * *